(12) United States Patent
Hadap

(10) Patent No.: US 7,791,606 B2
(45) Date of Patent: Sep. 7, 2010

(54) GOAL-DIRECTED CLOTH SIMULATION

(75) Inventor: Sunil Sharadchandra Hadap, Foster City, CA (US)

(73) Assignee: Pacific Data Images LLC, Redwood City, CA (US)

(*) Notice: Subject to any disclaimer, the term of this patent is extended or adjusted under 35 U.S.C. 154(b) by 1082 days.

(21) Appl. No.: 11/408,811

(22) Filed: Apr. 21, 2006

(65) Prior Publication Data

US 2007/0247465 A1    Oct. 25, 2007

(51) Int. Cl.
*G06T 13/00* (2006.01)
(52) U.S. Cl. ............... 345/473; 345/419; 345/420; 345/474; 345/475
(58) Field of Classification Search .......... None
See application file for complete search history.

(56) References Cited

U.S. PATENT DOCUMENTS

| 6,456,289 | B1 | 9/2002 | O'Brien et al. | |
|---|---|---|---|---|
| 7,450,122 | B2* | 11/2008 | Petrovic et al. | 345/426 |
| 2002/0180739 | A1 | 12/2002 | Reynolds et al. | |
| 2004/0056871 | A1 | 3/2004 | Milliron | |
| 2006/0139347 | A1* | 6/2006 | Choi et al. | 345/419 |

OTHER PUBLICATIONS

International Search Report and Written Opinion mailed Mar. 3, 2008, for PCT Application No. PCT/US07/09651 filed Apr. 19, 2007, 8 pages.

"Animating Cloth," Chapter 5 *In Cloth: Maya Unlimited (Version 6)*, Alias Systems, 2004, pp. 73-92.
"Applying properties to Cloth", Chapter 4 *In Cloth: Maya Unlimited (Version 6)*, Alias Systems, 2004, pp. 57-70.
Baraff, David et al. (1998) "Large Steps in Cloth Simulation," Proceedings of ACM SIGGRAPH 98, ACM Press, pp. 43-54.
Bridson, Robert et al. (Jul. 2002) "Robust Treatment of Collisions, Contact and Friction for Cloth Animation," ACM Transactions on Graphics (ACM SIGGRAPH 2002), 21(3): 594-603.
Bridson, R. et al. (2003) "Simulation of Clothing with Folds and Wrinkles," Proceedings of ACM SIGGRAPH/Eurogrphics Symposium on Comuter Animation (SCA 2003), ACM Press, pp. 28-36.
Choi, Kwang-Jin et al. (Jul. 2002) "Stable but Responsive Cloth," ACM Transactions on Graphics (ACM SIGGRAPH 2002), 21(3): 604-611.
"Deformers," Chapter 4 *in Character Setup: Maya Unlimited (Version 6)*, Alias Systems, 2004, pp. 231-249.
Foley, James D. et al. (1990) "Animation" Chapter 21 *In Computer Graphics: Principles and Practice, 2nd ed.*, Addison-Wesley Publishing Company, pp. 1057-1081.

(Continued)

*Primary Examiner*—Antonio A Caschera
(74) *Attorney, Agent, or Firm*—Morrison & Foerster LLP

(57) ABSTRACT

A method of simulating a cloth includes: determining a first shape for the cloth at a first time; determining a first goal shape for the cloth at the first time; determining a first goal-directed force for the cloth at the first time from the first shape and the first goal shape, wherein the first goal directed force includes a component that measures a difference between the first shape and the first goal shape; and determining a second shape for the cloth at a second time from the first shape and the first goal-directed force by dynamically advancing the cloth from the first time to the second time.

27 Claims, 6 Drawing Sheets

OTHER PUBLICATIONS

Grinspun, Eitan et al. (2003) "Discrete Shells," Proceedings of ACM SIGGRAPH/Eurogrphics Symposium on Computer Animation (SCA 2003), ACM Press, pp. 62-67.

Press, William H. et al. (1988), *Numerical Recipes in C: The Art of Scientific Computing*, Cambridge University Press, p. 567.

Vollino, Pascal et al. (1995) "Versatile and Efficient Techniques for Simulating cloth and Other Deformable Objects," Proceedings of ACM SIGGRAPH 1995, ACM Press, pp. 137-144.

* cited by examiner

```
l[i] = p*[i] – p[i];
d[i] = length(l[i]);

if ( d[i] > D0 and d[i] < D1 ) { f[i] = Ks[i](d[i]–D0)l[i]/d[i];
    f[i] += Kd[i](v*[i]–v[i]);
    if (length(f[i]) > F0) f[i] = zero;

} else { f[i] = zero;
}
```

FIG. 3

GOAL-DIRECTED CLOTH SIMULATION

BACKGROUND OF THE INVENTION

1. Field of Invention

The present invention relates to simulation and animation generally and more particularly to simulating cloth in applications related to animation technology.

2. Description of Related Art

Cloth animation is frequently a key ingredient for adding believability to computer generated imagery. A variety of approaches have been developed within the Computer Animation and Visual Effects industry including methods based on key-frame animation and numerical simulation. Key-frame animation generally involves specifying key frames that can be interpolated (or stitched together) for the animation. For example, in some operational settings twenty-four frames are used per second of animation, and one out of ten frames are key frames (not necessarily uniformly spaced). Numerical simulation generally involves integration of a related dynamic model that is sampled at the desired animation frequency (e.g., 24 Hz). ("Stable but responsive cloth", K.-J. Choi and H.-S. Ko, *ACM Transactions on Graphics* (*ACM SIGGRAPH* 2002), 21(3):604-611, July 2002; "Large steps in cloth simulation", D. Baraff and A. Witkin, In *Proceedings of ACM SIGGRAPH* 98, pages 43-54, ACM Press, 1998; "Versatile and efficient techniques for simulating cloth and other deformable objects", P. Volino, M. Courchesne, and N. Magnenat-Thalmann, *Proceedings of ACM SIGGRAPH* 95, pages 137-144, ACM Press, 1995; "Robust treatment of collisions, contact and friction for cloth animation", R. Bridson, R. Fedkiw, and J. Anderson, *ACM Transactions on Graphics* (*ACM SIGGRAPH* 2002), 21(3):594-603, July 2002; "Simulation of clothing with folds and wrinkles", R. Bridson, S. Marino, and R. Fedkiw, *Proceedings of ACM SIGGRAPH/Eurographics Symposium on Computer Animation* (*SCA* 2003), pages 28-36, ACM Press, 2003; "Discrete shells", E. Grinspun, A. Hirani, M. Desbrun, and P. Schröder, *Proceedings of ACM SIGGRAPH/Eurographics Symposium on Computer Animation* (*SCA* 2003), pages 62-67, ACM Press, 2003.)

In general, a more realistic cloth animation can be realized by a direct numerical simulation. In this type of animation, the animator typically sets up an initial shape of a garment and defines a set of physical properties for the cloth such as material density, stretch and bend stiffness, internal damping, air drag and collision friction. Typically, the animator also sets up other dynamic objects such as static and moving collision obstacles and specifies external force fields (e.g., based on wind or gravity) to form a realistic dynamic scene. The dynamic scene also may include constraints on cloth motion, for example, to model seams, elastic elements, and tack pins. In addition there may be additional forces or constraints that do not have any direct physical significance. In this way, the animator can control the overall look and feel of the cloth motion by controlling the elements of the dynamic scene and related physical or nonphysical parameters that can be specified by spatial distributions. However animator's control over details in the motion and overall time evolution of cloth shape may be limited, for example, to key-framing some aspects of the dynamics (e.g., as an initial condition).

Under the best conditions, the motion thus computed is very believable and rich in details that relate to the underlying physics. It is very difficult, or even impossible, to achieve a corresponding complexity of motion by a traditional approach of key-frame based animation. However, the direct numerical simulation is limited in that, unlike key-frame based animation, it is more difficult to specifically direct the resulting motion. Often, an artistic director desires a specific detail in the motion or even some change the overall aspect of the motion. For example, the director might want the cloth to flutter in a specific way or to retain some semi-rigid shape. In general, the form of the numerical simulation makes it difficult or at least cumbersome to achieve precise control over the cloth simulation (e.g., by re-setting the initial condition). Thus, substantial background analysis and multiple iterations may be required to achieve a cloth animation that satisfies the director's artistic vision.

Thus, there is a need for improved cloth simulation particularly for applications related to animation technology.

SUMMARY OF THE INVENTION

In one embodiment of the present invention, a method of simulating a cloth includes: determining a first shape for the cloth at a first time; determining a first goal shape for the cloth at the first time; determining a first goal-directed force for the cloth at the first time from the first shape and the first goal shape, wherein the first goal-directed force includes a component that measures a difference between the first shape and the first goal shape; and determining a second shape for the cloth at a second time from the first shape and the first goal-directed force by dynamically advancing the cloth from the first time to the second time.

According to one aspect of this embodiment, determining the first shape may include specifying values for the first shape at a plurality of control points for the cloth, wherein the first shape includes an interpolation of the specified values at the control points. According to another aspect, determining a first goal shape for the cloth at the first time may include: defining a lattice for controlling values for multiple control points of the cloth, wherein an interpolation of the values for the control points defines a corresponding goal shape for the cloth; and prescribing first lattice values of the lattice for specifying the first goal shape.

According to another aspect, determining the first goal-directed force for the cloth may include multiplying at least one component of the difference between the first shape and the first goal shape by at least one stiffness value. Further, determining the first shape for the cloth may include determining a first velocity for the cloth; determining the first goal shape for the cloth may include determining a first goal velocity for the cloth; and determining the first goal-directed force for the cloth may include multiplying at least one component of a difference between the first velocity for the cloth and the first goal velocity for the cloth by at least one damping value.

According to another aspect, dynamically advancing the cloth from the first time to the second time may include calculating dynamic trajectories from the first time to the second time for a plurality of control points for the cloth. According to another aspect, determining the first shape for the cloth may include calculating a plurality of values for the first shape at a plurality of control points for the cloth, wherein the first shape includes an interpolation of the values for the first shape at the control points; determining a first goal shape for the cloth may include calculating a plurality of values for the first goal shape at the control points, wherein the first goal shape includes an interpolation of the values for the first goal shape at the control points; and determining a second shape for the cloth may include calculating a plurality of values for the second shape at the control points, wherein the second shape includes an interpolation of the values for the second shape at the control points.

According to another aspect, the method may further include: determining a second goal shape for the cloth at the second time; determining a second goal-directed force for the cloth at the second time from the second shape and the second goal shape, wherein the second goal-directed force includes a component that measures a difference between the second shape and the second goal shape; and determining a third shape for the cloth at a third time from the second shape and the second goal-directed force by animating the cloth from the second time to the third time.

According to another aspect, the method may further include: determining a sequence of animation frames, including a first animation frame that includes values from the first shape for the cloth and a second animation frame that includes values from the second shape for the cloth.

Additional embodiments relate to an apparatus that includes a computer that executes instructions for carrying out any one of the above-described methods. For example, the computer may include a processor with memory for executing at least some of the instructions. Additionally or alternatively the computer may include a specialized microprocessor or other hardware for executing at least some of the instructions. Additional embodiments also relate to a computer-readable medium that stores (e.g., tangibly embodies) a computer program for carrying out any one of the above-described methods with a computer. In these ways the present invention enables improved cloth simulation for applications related to animation technology.

BRIEF DESCRIPTION OF THE DRAWINGS

FIG. 3 shows an exemplary set of code instruction for calculating forces related to the embodiment shown in FIG. 1.

DETAILED DESCRIPTION OF EXEMPLARY EMBODIMENTS

Figure 1:
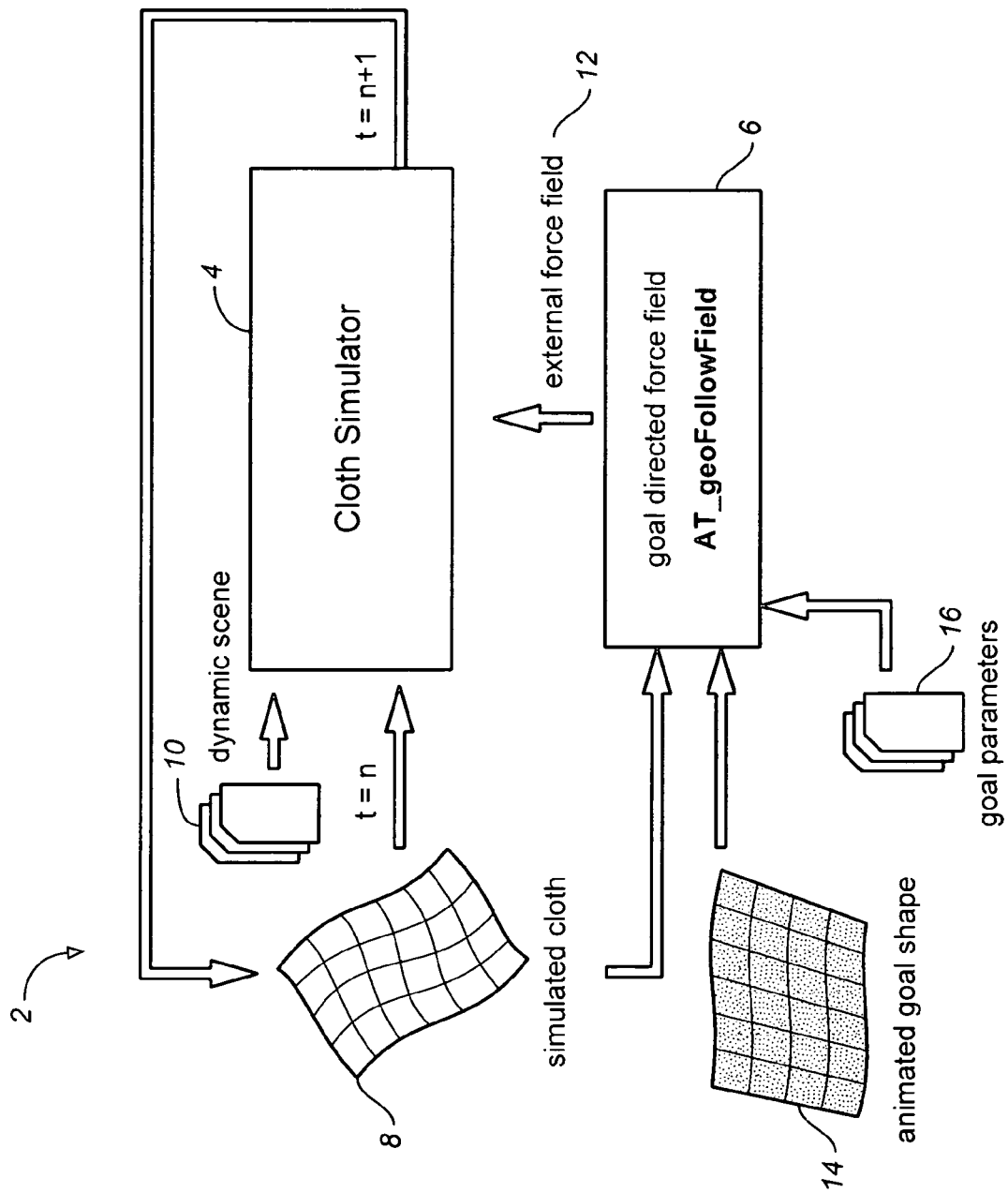
FIG. 1 shows an exemplary method for simulating a cloth according to the present invention.

FIG. 1 shows an exemplary method 2 for simulating cloth according to the present invention. The system includes a cloth simulator 4, which propagates the dynamics of the simulated cloth 8, and a force generator 6, which generates a goal-directed force field. The cloth simulator 6 may be a standard cloth simulator, which takes as input the current state of the cloth at current time t=n in the form of positions and velocities of cloth mesh vertices. In the context of the popular Maya™ animation software, the external force field 12 can be implemented as a plug-in field node called AT_geoFollow-Field. ("Animating Cloth", Chapter 5, *Cloth|Maya Unlimited* (version 6), Alias Systems, 2004, pp. 73-92.)

In this context the simulated cloth 8 is typically one of many geometrical elements in a dynamic scene that will be represented in a sequence of animation frames (e.g., at 24 Hz). Positions for these geometric elements can be characterized in a number of ways including, for example, a parameterized Cartesian representation in two or three dimensions or a more complex basis-function representation. In some contexts, the placement of an array of elements (or points) defines a geometric shape or surface in the animation process (e.g., by an interpolation). In general this geometric characterization (e.g., 3D scene data) should be usable as an input for a subsequent rendering operation. (*Computer Graphics: Principles and Practice* (2nd ed.), J. Foley, A. van Dam, S. Feiner, and J. Hughes, Addison-Wesley, 1990.)

The cloth simulator 4 dynamically advances (e.g., integrates) the solution of cloth motion from time t=n (e.g., a first time) to the next time t=n+1 (e.g., a second time). The newly computed state becomes the input for the next integration step (e.g. to a third time). Taking the discrete time steps, the simulator 4 successively evolves the motion of the simulated cloth 8 in time. The process is generally referred to as a solution of initial value problem in ordinary differential equations, found in the standard text books on the subject. (*Numerical Recipes in C*, Cambridge University Press, 1988, pp. 566-569.) Relevant dynamic scene parameters 10 may include physical properties of cloth, obstacles, constraints, determine the intrinsic aspects of cloth simulation. (Note that the words "first" and "second" are used here and elsewhere for labeling purposes only and are not intended to denote any spatial or temporal ordering. Furthermore, the labeling of a "first" element does not imply the presence a "second" element.)

A typical cloth simulator 4 accepts an external force field 12, which one can develop as a plug-in module to the cloth simulator 4. As shown in FIG. 1, inputs of the force generator 6 include the current state of the simulated cloth 8 at time t=n, an animated goal shape 14, and one or more goal parameters 16. The current state of the simulated cloth 8 may, for example, be represented by positions (or positions and velocities) at control points (or control vertices) of the cloth (e.g., represented by grid intersection of the cloth shapes 8). And the animated goal shape 14 may be similarly represented. Preferably, the topology of the cloth mesh and the topology of the animated goal shape remain constant throughout the simulation. However, as described below, it is not necessary that the two topologies match. The resulting force field 12 is designed (or tuned) to balance dynamic realism with the desired goal shape 14 by driving the cloth towards the goal in the dynamic context provided by the cloth simulator.

Figure 2:
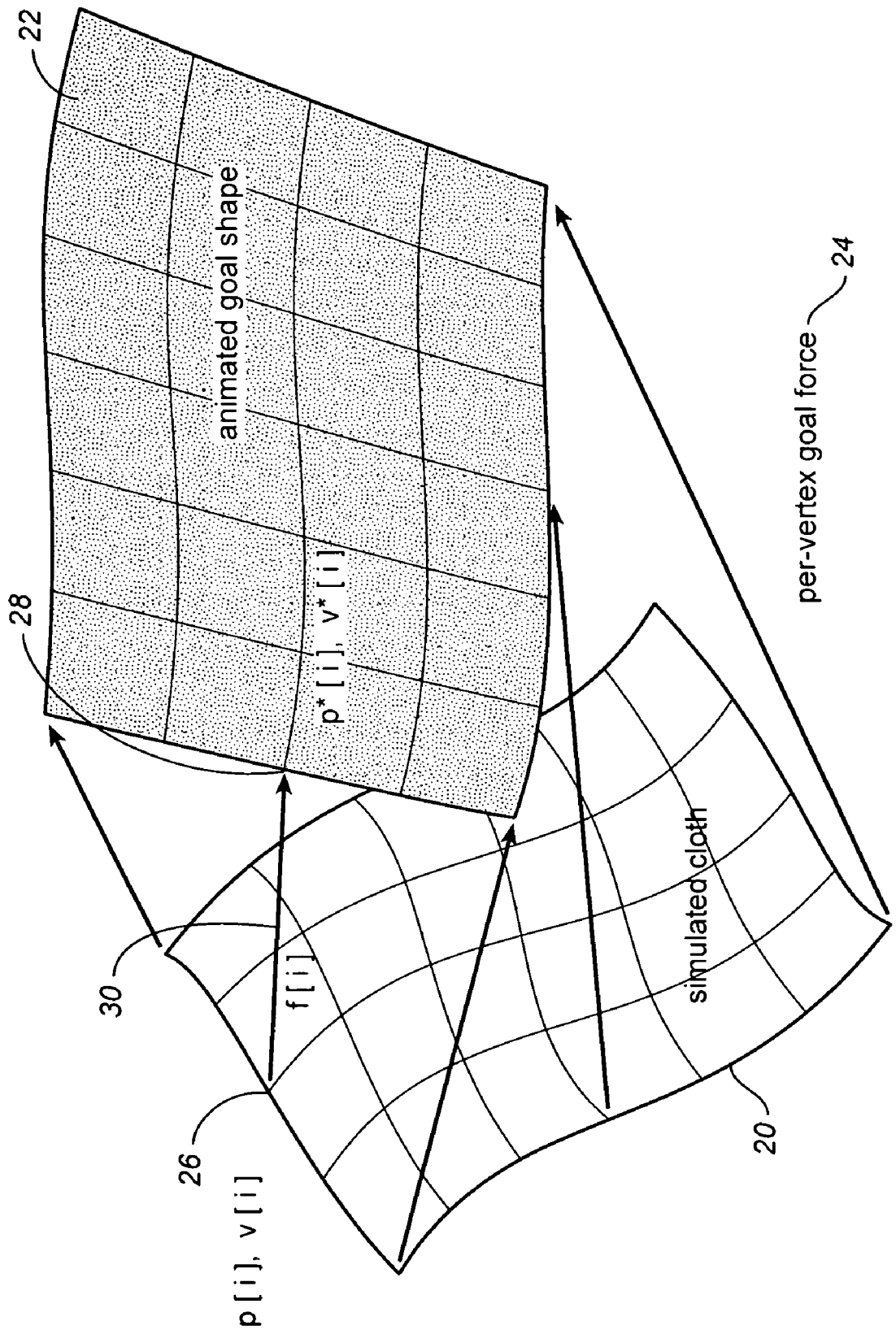
FIG. 2 shows an exemplary method for calculating forces related to the embodiment shown in FIG. 1.

A variety of methods may be employed to generate the force field 12, including formulations based on thin shell dynamics and proportional-integral-derivative (PID) control. FIG. 2 shows an exemplary embodiment based on a simple spring-like force model between the vertices of the simulated cloth 20 and the animated goal shape 22.

The force field 24 includes a set of forces that are applied to the simulated cloth 20 on a per vertex basis. As stated above, it is not necessary that the cloth topology be the same as the goal topology so that there is considerable flexibility in the choice for the goal geometry and its animation. The first step in the process of computing forces involves establishing correspondence between the cloth mesh vertices 26 and positions on the goal shape 22. If the topology of the meshes matches, the correspondence is trivial. In the case of topology mismatch, we use texture coordinates to establish the correspondence. Consider a cloth mesh vertex i, with position p[i] 26, as depicted in FIG. 2. Let (s[i], t[i]) be the texture coordinates of this vertex. (For example, $0 \leq s[i] \leq 1$ and $0 \leq t[i] \leq 1$, where the coordinates of the corners are (0,0), (0,1), (1,0), and (1,1).) Then the texture coordinates on the simulated shape 20 can be mapped to the texture coordinates of the goal shape 22) by mapping the corresponding corners and interpolating (e.g., linearly) between the corners. Then let the position on the goal mesh 22 corresponding to (s[i], t[i]) texture coordinates be p*[i] 28, and let the velocity of the goal mesh at the position p*[i] be v*[i]. Thus for the vertex i with its position p[i] and its velocity v[i], the correspondence in goal mesh is position p*[i] and velocity v*[i].

To formulate the spring force f[i] 30 between the point p[i] 26 on the simulated cloth 20 and the corresponding point p*[i] 28 on the animated goal shape 22, we define set of constants associated with the per-vertex goal force 24. For example, these constants are represented by the goal parameters 16 in FIG. 1. For the exemplary force-generating method 32 shown in FIG. 3, these constants are as follows: spring stiffness Ks, spring damping Kd, minimum distance of field influence D0, maximum distance of field influence D1, and maximum force F0.

As shown in FIG. 3, a difference l[i] is calculated from the positions p[i] and p*[i] and the length (e.g., magnitude or norm) d[i] of this difference vector is calculated to check the magnitude thresholds set by D0 and D1. A force calculation is made the using the position difference and the spring stiffness Ks[i], and a corresponding force calculation is made using a velocity difference and the spring damping Kd[i]. The magnitude of the force is also compared against the threshold F0. In this embodiment the resulting force f[i] is zeroed if any of the thresholds (D0, D1, F0) are violated but alternative embodiments are similarly possible (e.g., setting the force f[i] to a maximum force if the force threshold F0 is violated). Similarly, other spring-like formulations are possible.

All the above-described parameters can be animated (e.g., given values over time) by means of key-framing (e.g., setting values once every ten frames) and possibly interpolating values between key frames. In addition, the user can specify the spatial variation of these parameters in the form of painted weight maps in the corresponding texture space (e.g., (s,t), $0 \leq s, t \leq 1$). This makes the use of the force field a very effective tool for achieving an acceptable cloth simulation. In general, nominal values for the parameters depend on the specific requirements of the application (e.g., the flimsiness or stiffness of the cloth) and are most significant for maintaining a proper balance between the terms since, for example, no actually physical forces need to be generated in order to carry out the simulation and the related animation.

Figure 4:
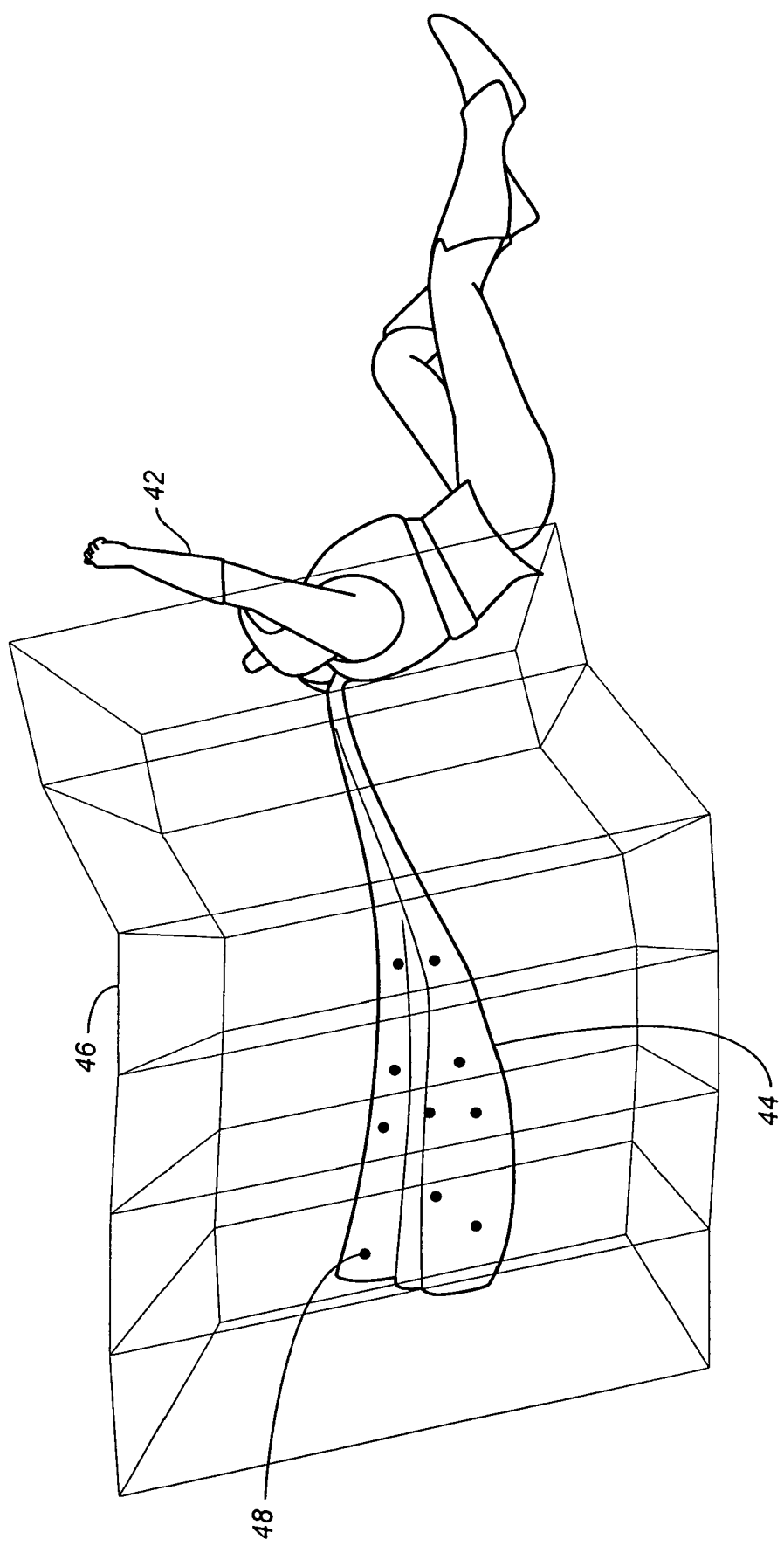
FIGS. 4, 5, and 6 show an exemplary animation detail related to the embodiment shown in FIG. 1.
Figure 5:
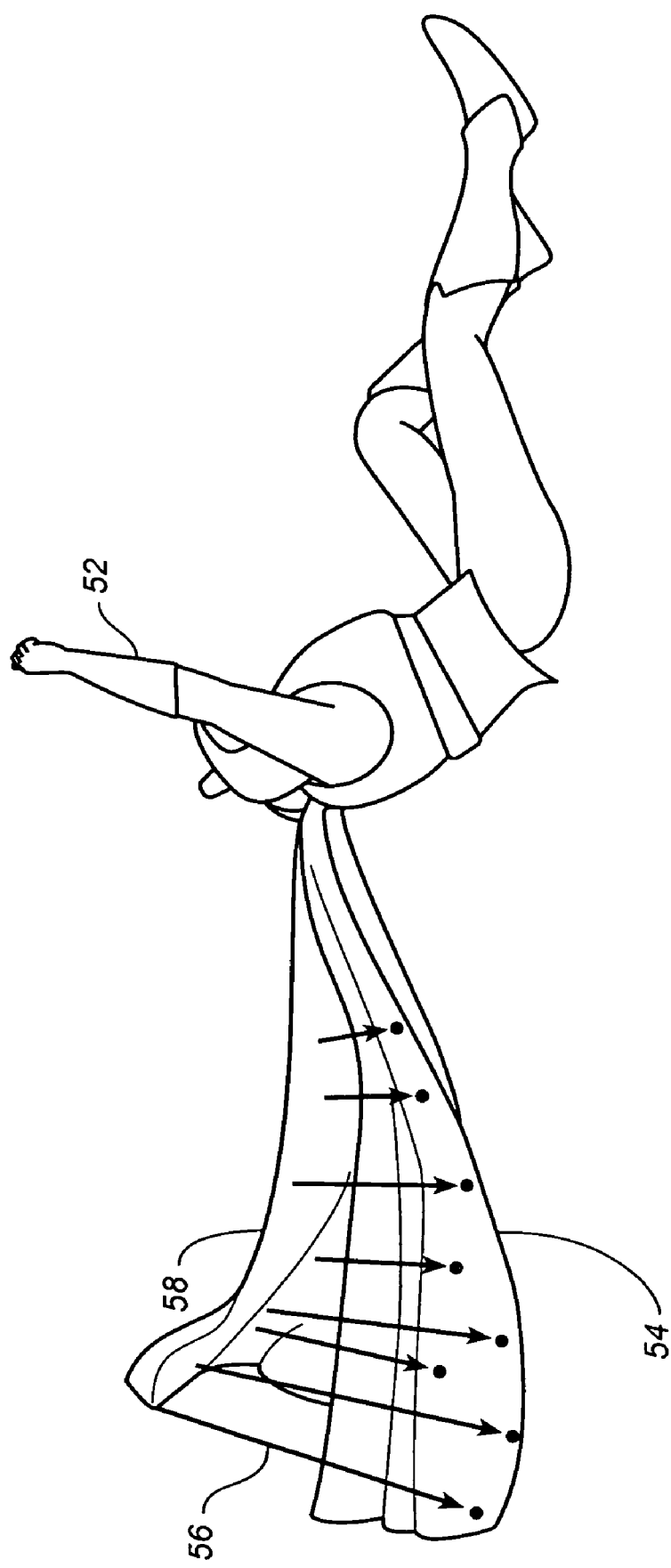
Figure 6:
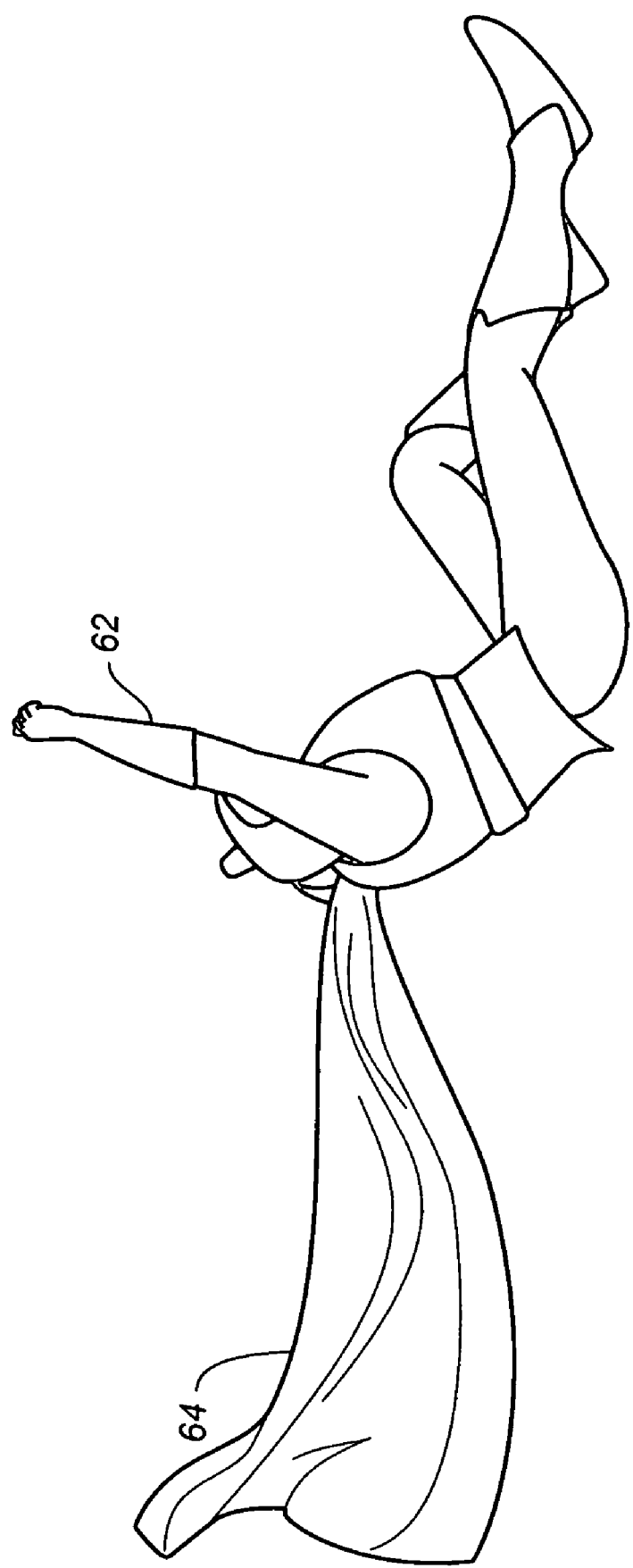

FIGS. 4-6 illustrate a specific embodiment directed to the creating a desired cape flutter in an animation sequence. In the relevant operational setting, the artistic director may prescribe specific properties of motion including amplitudes and frequencies related to the cloth flutter as the cape follows the animated character. These art-directed properties are then used to specify the corresponding goal shape in the simulation.

FIG. 4 shows a character 42 in an animation sequence. A goal shape 44 is shown together with a lattice deformer 46 that is used to control specific control points 48 (e.g., control vertices) of the goal shape 44. Typically the goal shape 44 is an interpolation (e.g., by splines or by linear interpolation as in a triangular mesh) of values at the control points 48.

As a first step, the animator animates the overall nature of cape's motion to reflect the desired motion qualities. For that, she uses a similar geometry as the cape, which will serve as the goal shape 44 in the subsequent steps. She then attaches a lattice deformer 46 to the geometry. The lattice deformer 46 is a simple way to deform a complex geometry using a coarse cage-like structure as shown in FIG. 4. The lattice 46 is placed around the cape geometry 44. The cape geometry is then attached to the lattice by the method of skinning, to calculate the deformation weights. As the animator edits the lattice 46, which can be a relatively coarse representation of the overall cape's shape, the cape geometry deforms accordingly. In this way the animator can animate the cape simply by keyframing few set of lattice vertices. Lattice deformers are well-known to those skilled in the animation arts. ("Deformers: About>Lattice Deformers", Chapter 4, *Character Setup\Maya Complete* (*version* 6), Alias Systems, 2004, pp. 243-249.) At the end of this process, the animator has defined the goal shape 44 as a simple animated motion of cape that satisfies the director's desired characteristics. Often, this simple animation of the cape geometry does not have geometric details and physical believability, as compared to the animation resulting from the cloth simulation.

In the next step the animator simulates the cloth by a cloth simulator 4 as illustrated in FIG. 1 where the force simulator 6 is consistent with FIGS. 2, 3, and 4. FIG. 5 shows the character 52 and the animated goal shape 54 (e.g., by animated the lattice deformer 46, which is not shown here). The resulting goal forces 56 and the simulated cloth 58 are also shown. In this step the animator can simulate the cape using off-the-shelf cloth simulator such as Maya™ Cloth. ("Applying Properties to Cloth", Chapter 4, *Cloth\Maya Unlimited* (*version* 6), Alias Systems, 2004, pp. 57-70.) Typically, the cloth simulator 4 provides only the high-level control over the cape's simulated motion in terms of physical parameters such as mass, stretch and bend stiffness and external force fields such as wind and turbulence. Note that the illustrated goal forces 56 can be considered as a set of individual springs (e.g., with stiffness and damping constants as in FIG. 3) inserted between the goal shape 54 and the simulated cloth 58 so that the goal forces 56 attract the simulated cloth 58 to the goal shape 54. Depending on the requirements for the animation, the animator can control how much the simulated cloth can deviate from the animated goal shape by varying the stiffness constants to tighten or loosen the springs. Likewise the damping constants may also be adjusted to control the settling times. Values for the goal shape 54 can be kept constant along each time interval in the animation process (e.g., at 24 Hz) or interpolations can be made from nearby key-frame values.

In the final step, after the performance targets have been met, the lattice deformer 46 and the goal shape 48 are removed from the animation. FIG. 6 shows just the character 62 and the animated cloth 64. Because of the tuning of the animation design parameters enabled by the present invention, the simulated cloth 64 can have rich details and physical believability while adhering to the desired overall characteristics for the behavior of the cloth.

In general, the above-described force field formulation works most effectively if the cloth 20 is in the vicinity of the goal shape 22. The spring constant Ks that drives the cloth 20 towards the goal shape 22 needs to be adequately stiff. Otherwise, the cloth 20 may deviate from the goal shape 22 too much due to the inertia of the cloth and external forces such as gravity. Typically the spring damping constant Kd is scaled as 1-10% of the spring stiffness Ks. If the damping is too small, the cloth will oscillate around the goal shape. If damping is too high, the cloth will exhibit extra sluggishness in reaching the goal shape.

For this specific embodiment, the cape has dimensions 120 cm×60 cm and has a mass density of 0.015 gm/cm$^2$ in the natural gravitational field with g=980 cm/sec$^2$. The spring stiffness Ks is 1300 gm/sec$^2$, and the spring damping Kd is 13 gm/sec (e.g., scaled as 1% of Ks). The minimum distance D0 is 0 cm, the maximum distance D1 is 106 cm, and the maximum force F0 is 13000 gm-cm/sec$^2$. The time-step is 1/(24*16) sec or approximately 2.6 milliseconds. In this case, the time-step was derived from a nominal animation rate of 24 frames per second (i.e., 24 Hz) combined with an integration resolution of 16 time-steps between animation frames. As noted above, the dimensions are somewhat arbitrary, but attaching physical dimensions may assist in maintaining a proper balance between the terms that determine the resulting forces (e.g., as in FIG. 3).

When additional constraints are introduced as part of the dynamic scene 10, the cloth is driven to attain the goal shape only within its range of possible motion. That is, the force generator 6 must be adapted to include these constraints as additional forces (e.g., penalty forces). Typically, the motion is limited by factors such as the cloth's-ability to stretch, collision avoidance, and constraints such as tack pins and seams. If the goal is in too much disagreement with the range of allowable cloth motion, (e.g., leading to substantial cloth stretching or obstacle penetration), the force formulations may generate large forces that will cause instability (or stiffness) in the cloth simulation.

In alternative embodiments of the present invention, the force generator 6 can be incorporated into the cloth simulator 4 so that the stability issues can be handled as a core feature of the cloth simulator 4 (e.g., by specialized integration routines for stiff systems). This approach can expand the overall stability region of the simulation process.

The present invention provides animators with direct and explicit control over the motion of the cloth resulting from direct numerical simulation. The animator can express the director's vision by animating a goal shape. The goal animation may not have physical realism and may lack details. However, the resulting cloth simulation closely follows the animated goal shape, adding rich visual complexity and physical realism, obeying constraints of cloth properties.

The present invention can be applied in a number of typical scenarios including controlling the quality and specific details of garment motion of an animated character, which would be otherwise very difficult to control. These details may include fluttering of a cape as the character rides a horse and controlling the motion of a scarf so that it does not obstruct the character's face.

Other typical scenarios relate to maintaining a semi-rigid shape of a cloth. For example, one can use cloth simulation to animate foliage, leaves and vines. The goal-directed force field can be used to give the this shell-like geometry its semi-rigid shape definition. Cloth with a goal directed semi-rigid shape can also be used for simulation of hairstyles of people or the manes of horses and lions. Related applications include maintaining complex and semi-rigid shapes of intricate costumes and accessories worn by animated character such as bows, ribbons, medals etc.

By increasing the corresponding stiffness constants one can use the invention to avoid undue motion of cloth-like objects such as necklaces and braid on a characters body. For example, even if an extreme motion is physically accurate, the director may want to control excessive motion of a necklace so that the audience is not distracted from the crucial facial expressions.

As described above, certain embodiments of the present invention address the problem of explicit control over cloth simulation through the specification of an animated goal shape (e.g., by artistic direction). A force field is then computed based on the input goal shape and the current cloth shape. The resulting force field is applied to the cloth, in addition to the other usual aspects of the cloth dynamics such as area preservation of surface, bend resistance and air drag, collision avoidance, etc. The proposed force field then drives the cloth to follow the goal shape, within the constraints inherent to the cloth dynamics and the collisions. Animating the goal shape is relatively simple, as it may not have all the motion details that the simulated cloth would have. It may even violate some basic constraints of cloth simulation such as area preservation and obstacle avoidance. Thus, it is typically relatively easy to setup the quality, time history and overall evolution of cloth shape, expressed by director's vision, in terms of the animated goal shape. The resulting cloth simulation has both, an explicit and simple animatable control and rich details for extra believability.

Additional embodiments relate to an apparatus that includes a computer that executes computer instructions for carrying out any one of the above-described methods. In this context the computer may be a general-purpose computer including, for example, a processor, memory, storage, and input/output devices (e.g., monitor, keyboard, disk drive, Internet connection, etc.). However, the computer may include a specialized microprocessor or other hardware for carrying out some or all aspects of the methods. Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language (e.g., Maya™ software).

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-implemented method of animating a cloth, implemented by a computer, wherein the computer comprises a processor, the method comprising:
   obtaining, using a processor, a first shape for the cloth at a first time;
   obtaining, using the processor, a first goal shape for the cloth at the first time, wherein the first goal shape is specified by a user using a plurality of goal shape control points, and wherein the first shape and the first goal shapes have different shapes;
   determining, using the processor, a first goal-directed force for the cloth at the first time from the first shape and the first goal shape, wherein the first goal-directed force includes a component that measures a difference between the first shape and the first goal shape; and
   determining, using the processor, a second shape for the cloth at a second time from the first shape and the first goal-directed force by dynamically advancing the cloth from the first time to the second time.

2. The computer-implemented method of claim 1, wherein obtaining the first shape includes specifying values for the first shape at a plurality of control points for the cloth, wherein the first shape includes an interpolation of the specified values at the control points.

3. The computer-implemented method of claim 1, wherein obtaining the first goal shape for the cloth at the first time includes:
   defining a lattice for controlling values for the plurality of goal shape control points of the cloth, wherein an interpolation of the values for the goal shape control points defines a corresponding goal shape for the cloth; and
   prescribing first lattice values of the lattice for specifying the first goal shape.

4. The computer-implemented method of claim 1, wherein obtaining the first goal-directed force for the cloth includes multiplying at least one component of the difference between the first shape and the first goal shape by at least one stiffness value.

5. The computer-implemented method of claim 4, wherein
obtaining the first shape for the cloth includes determining a first velocity for the cloth;
obtaining the first goal shape for the cloth includes determining a first goal velocity for the cloth; and
determining the first goal-directed force for the cloth includes multiplying at least one component of a difference between the first velocity for the cloth and the first goal velocity for the cloth by at least one damping value.

6. The computer-implemented method of claim 1, wherein dynamically advancing the cloth from the first time to the second time includes calculating dynamic trajectories from the first time to the second time for a plurality control points for the cloth.

7. The computer-implemented method of claim 1, wherein
obtaining the first shape for the cloth includes calculating a plurality of values for the first shape at a plurality of control points for the cloth, wherein the first shape includes an interpolation of the values for the first shape at the control points;
obtaining the first goal shape for the cloth includes calculating a plurality of values for the first goal shape at the control points, wherein the first goal shape includes an interpolation of the values for the first goal shape at the control points; and
determining a second shape for the cloth includes calculating a plurality of values for the second shape at the control points, wherein the second shape includes an interpolation of the values for the second shape at the control points.

8. The computer-implemented method of claim 1, further comprising:
obtaining a second goal shape for the cloth at the second time;
determining a second goal-directed force for the cloth at the second time from the second shape and the second goal shape, wherein the second goal-directed force includes a component that measures a difference between the second shape and the second goal shape; and
determining a third shape for the cloth at a third time from the second shape and the second goal-directed force by animating the cloth from the second time to the third time.

9. The computer-implemented method of claim 1, further comprising:
determining a sequence of animation frames, including a first animation frame that includes values from the first shape for the cloth and a second animation frame that includes values from the second shape for the cloth.

10. An apparatus for animating a cloth, the apparatus comprising:
a computer processor for executing computer instructions; and
a computer-readable storage medium having stored thereon instructions for:
obtaining a first shape for the cloth at a first time;
obtaining a first goal shape for the cloth at the first time, wherein the first goal shape is specified by a user using a plurality of goal shape control points, and wherein the first shape and the first goal shapes have different shapes;
determining a first goal-directed force for the cloth at the first time from the first shape and the first goal shape, wherein the first goal-directed force includes a component that measures a difference between the first shape and the first goal shape; and
determining a second shape for the cloth at a second time from the first shape and the first goal-directed force by dynamically advancing the cloth from the first time to the second time.

11. The apparatus of claim 10, wherein instructions for obtaining the first shape includes specifying values for the first shape at a plurality of control points for the cloth, wherein the first shape includes an interpolation of the specified values at the control points.

12. The apparatus of claim 10, wherein instructions for obtaining a first goal shape for the cloth at the first time includes:
defining a lattice for controlling values for the plurality of goal shape control points of the cloth, wherein an interpolation of the values for the goal shape control points defines a corresponding goal shape for the cloth; and
prescribing first lattice values of the lattice for specifying the first goal shape.

13. The apparatus of claim 10, wherein instructions for obtaining the first goal-directed force for the cloth includes multiplying at least one component of the difference between the first shape and the first goal shape by at least one stiffness value.

14. The apparatus of claim 13, wherein
instructions for obtaining the first shape for the cloth includes determining a first velocity for the cloth;
instructions for obtaining the first goal shape for the cloth includes determining a first goal velocity for the cloth; and
instructions for determining the first goal-directed force for the cloth includes multiplying at least one component of a difference between the first velocity for the cloth and the first goal velocity for the cloth by at least one damping value.

15. The apparatus of claim 10, wherein dynamically advancing the cloth from the first time to the second time includes calculating dynamic trajectories from the first time to the second time for a plurality control points for the cloth.

16. The apparatus of claim 10, wherein
instructions for obtaining the first shape for the cloth includes calculating a plurality of values for the first shape at a plurality of control points for the cloth, wherein the first shape includes an interpolation of the values for the first shape at the control points;
instructions for obtaining a first goal shape for the cloth includes calculating a plurality of values for the first goal shape at the control points, wherein the first goal shape includes an interpolation of the values for the first goal shape at the control points; and
instructions for determining a second shape for the cloth includes calculating a plurality of values for the second shape at the control points, wherein the second shape includes an interpolation of the values for the second shape at the control points.

17. The apparatus of claim 10, further comprising instructions for:
obtaining a second goal shape for the cloth at the second time;
obtaining a second goal-directed force for the cloth at the second time from the second shape and the second goal shape, wherein the second goal-directed force includes a component that measures a difference between the second shape and the second goal shape; and
determining a third shape for the cloth at a third time from the second shape and the second goal-directed force by animating the cloth from the second time to the third time.

18. The apparatus of claim 10, further comprising instructions for:
 determining a sequence of animation frames, including a first animation frame that includes values from the first shape for the cloth and a second animation frame that includes values from the second shape for the cloth.

19. A non-transitory computer-readable storage medium that stores a computer program for animating a cloth, wherein the computer program includes computer-executable instructions for:
 obtaining a first shape for the cloth at a first time;
 obtaining a first goal shape for the cloth at the first time, wherein the first goal shape is specified by a user using a plurality of goal shape control points, and wherein the first shape and the first goal shapes have different shapes;
 determining a first goal-directed force for the cloth at the first time from the first shape and the first goal shape, wherein the first goal directed force includes a component that measures a difference between the first shape and the first goal shape; and
 determining a second shape for the cloth at a second time from the first shape and the first goal-directed force by dynamically advancing the cloth from the first time to the second time.

20. The non-transitory computer-readable storage medium as claimed in claim 19, wherein instructions for obtaining the first shape includes specifying values for the first shape at a plurality of control points for the cloth, wherein the first shape includes an interpolation of the specified values at the control points.

21. The non-transitory computer-readable storage medium as claimed in claim 19, wherein instructions for obtaining a first goal shape for the cloth at the first time includes:
 defining a lattice for controlling values for the plurality of goal shape control points of the cloth, wherein an interpolation of the values for the goal shape control points defines a corresponding goal shape for the cloth; and
 prescribing first lattice values of the lattice for specifying the first goal shape.

22. The non-transitory computer-readable storage medium as claimed in claim 19, wherein instructions for determining the first goal-directed force for the cloth includes multiplying at least one component of the difference between the first shape and the first goal shape by at least one stiffness value.

23. The non-transitory computer-readable storage medium as claimed in claim 22, wherein
 instructions for obtaining the first shape for the cloth includes determining a first velocity for the cloth;
 instructions for obtaining the first goal shape for the cloth includes determining a first goal velocity for the cloth; and instructions for determining the first goal-directed force for the cloth includes multiplying at least one component of a difference between the first velocity for the cloth and the first goal velocity for the cloth by at least one damping value.

24. The non-transitory computer-readable storage medium as claimed in claim 19, wherein dynamically advancing the cloth from the first time to the second time includes calculating dynamic trajectories from the first time to the second time for a plurality control points for the cloth.

25. The non-transitory computer-readable storage medium as claimed in claim 19, wherein
 instructions for obtaining the first shape for the cloth includes calculating a plurality of values for the first shape at a plurality of control points for the cloth, wherein the first shape includes an interpolation of the values for the first shape at the control points;
 instructions for obtaining the first goal shape for the cloth includes calculating a plurality of values for the first goal shape at the control points, wherein the first goal shape includes an interpolation of the values for the first goal shape at the control points; and
 instructions for determining a second shape for the cloth includes calculating a plurality of values for the second shape at the control points, wherein the second shape includes an interpolation of the values for the second shape at the control points.

26. The non-transitory computer-readable storage medium as claimed in claim 19, wherein the computer program further includes instructions for:
 obtaining a second goal shape for the cloth at the second time;
 obtaining a second goal-directed force for the cloth at the second time from the second shape and the second goal shape, wherein the second goal-directed force includes a component that measures a difference between the second shape and the second goal shape; and
 determining a third shape for the cloth at a third time from the second shape and the second goal-directed force by animating the cloth from the second time to the third time.

27. The non-transitory computer-readable storage medium as claimed in claim 19, wherein the computer program further includes instructions for:
 determining a sequence of animation frames, including a first animation frame that includes values from the first shape for the cloth and a second animation frame that includes values from the second shape for the cloth.

* * * * *

UNITED STATES PATENT AND TRADEMARK OFFICE
CERTIFICATE OF CORRECTION

| | | |
|---|---|---|
| PATENT NO. | : 7,791,606 B2 | Page 1 of 1 |
| APPLICATION NO. | : 11/408811 | |
| DATED | : September 7, 2010 | |
| INVENTOR(S) | : Sunil Sharadchandra Hadap | |

It is certified that error appears in the above-identified patent and that said Letters Patent is hereby corrected as shown below:

On the Cover page, item (56), under "Other Publications", in column 2, line 11, delete "SIGGRAPH/Eurogrphics" and insert -- SIGGRAPH/Eurographics--, therefor.

On the Cover page, item (56), under "Other Publications", in column 2, line 12, delete "Comuter" and insert -- Computer --, therefor.

On the Cover page, item (56), under "Other Publications", in column 2, line 16, delete "in" and insert -- In --, therefor.

On the Cover page, item (57), in "Abstract", in column 2, line 5, delete "goal directed" and insert -- goal-directed --, therefor.

On page 2, in column 1, under "Other Publications", line 2, delete "SIGGRAPH/Eurogrphics" and insert -- SIGGRAPH/Eurographics --, therefor.

In column 6, line 58, delete "106 cm," and insert -- $10^6$ cm, --, therefor.

In column 7, line 38, delete "goal directed" and insert -- goal-directed --, therefor.

In column 9, line 13, in claim 6, before "control" insert -- of --.

In column 10, line 38, in claim 15, before "control" insert -- of --.

In column 11, line 19, in claim 19, delete "goal directed" and insert -- goal-directed --, therefor.

In column 12, line 10, in claim 24, before "control" insert -- of --.

Signed and Sealed this
Twenty-eighth Day of December, 2010

David J. Kappos
*Director of the United States Patent and Trademark Office*